(12) United States Patent
Schulte-Tigges

(10) Patent No.: US 8,191,866 B2
(45) Date of Patent: Jun. 5, 2012

(54) SYSTEM FOR ACCUMULATING HYSTERESIS MOVEMENTS

(76) Inventor: Gotthard Schulte-Tigges, Berlin (DE)

( * ) Notice: Subject to any disclaimer, the term of this patent is extended or adjusted under 35 U.S.C. 154(b) by 1158 days.

(21) Appl. No.: 11/876,189

(22) Filed: Oct. 22, 2007

(65) Prior Publication Data
US 2008/0173115 A1    Jul. 24, 2008

Related U.S. Application Data

(63) Continuation-in-part of application No. PCT/DE2005/001182, filed on Jun. 29, 2005.

(30) Foreign Application Priority Data

Apr. 20, 2005    (DE) .......................... 10 2005 019 226

(51) Int. Cl.
*B66D 1/00* (2006.01)
(52) U.S. Cl. ........................................ 254/277; 254/275
(58) Field of Classification Search ................. 254/277, 254/278, 214, 266, 275
See application file for complete search history.

(56) References Cited

U.S. PATENT DOCUMENTS

| | | | |
|---|---|---|---|
| 4,456,226 A | | 6/1984 | Stumpmeier |
| 4,596,271 A | * | 6/1986 | Brundage ..................... 137/540 |
| 4,907,475 A | * | 3/1990 | Holbrook ...................... 477/134 |
| 4,915,204 A | * | 4/1990 | Klotz et al. ................. 192/48.61 |
| 7,309,828 B2 | * | 12/2007 | Ludwig ............................ 84/622 |
| 7,767,902 B2 | * | 8/2010 | Ludwig ............................ 84/741 |
| 2002/0148692 A1 | * | 10/2002 | Jensen et al. .................. 188/313 |
| 2002/0194939 A1 | | 12/2002 | Cox |

FOREIGN PATENT DOCUMENTS

| | | |
|---|---|---|
| DE | 1531334 A1 | 12/1969 |
| DE | 4436067 A1 | 4/1996 |
| GB | 1162999 A | 9/1969 |

\* cited by examiner

*Primary Examiner* — Emmanu M Marcelo
(74) *Attorney, Agent, or Firm* — Joyce von Natzmer; Agris & von Natzmer LLP

(57) ABSTRACT

With certain technical applications actuation has to be carried out at positions where the required energy supply is costly or difficult to provide. The invention offers a solution to this problem with a mechanical process, which functions without energy, for those cases where operation-related variable force or torque occurs, or where such force or torque fluctuations can be artificially produced. The invention concerns, on the one hand, the storage of rope segment that, multiplied by existing force, represents stored work, whereby the force contact point moves against the direction of force. On the other hand, it concerns the subsequent utilization of this stored rope segment for actuation, with actuation being gained from the stored rope segment through force prevailing at this time, whereby the force contact point moves in the direction of force.

26 Claims, 17 Drawing Sheets

SYSTEM FOR ACCUMULATING HYSTERESIS MOVEMENTS

CROSS-REFERENCE TO RELATED APPLICATIONS

This is a continuation-in-part application of international application no. PCT/DE05/01182, filed on Jun. 29, 2005, designating the United States, which claims priority to German Appl. No. 10 2005 019 226.2, filed on Apr. 20, 2005. The content of these applications are incorporated herein by reference in their entirety.

DETAILED DESCRIPTION OF THE INVENTION

The present invention relates to a system for the storage of hysteresis movements, in particular of segmental or rotational equivalents, and the utilization of such hysteresis movements for actuation.

The mechanical securing or control of devices by means of ropes, hawsers, chains or belts with tensile force, or by means of bending-resistant elements such as rods or gear racks with compressive force, requires in many areas an adjustable guideway on account of changing external circumstances. The required tension is maintained or guaranteed by an adjustable guideway.

Examples of such means of securing are the mooring of ships in harbours and ports with tidal range or with buoys on the high seas, the adjustment of damper elements or the towing of kites. This flexible securing requires mechanical actuation in order to react to changes in external circumstances and to maintain or achieve a desired "securing status". Energy is required to carry out such mechanical actuating activity.

Since actuation often has to be carried out at places that are difficult to access, the provision of energy required for actuation mostly involves high costs and is difficult to realize. A further problem with the provision of the required energy is that if energy supply by cable is not possible an energy storage device is necessary, which always has only a limited capacity.

State of the art devices for guaranteeing energy supply for mechanical actuation that requires external energy supply are already available. The energy required for the adjustment of a rope guideway is provided, for example, by loadable storage batteries or solar cells. If renewable energy sources, such as sun and wind, are not available, or not available to the required extent, the operating time of an actuating drive that is dependent on external energy sources is limited.

Based on the latest developments in technology, the function of the present invention is to create a device as well as a method for the conversion of variable force or torque for the purpose of its storage, and to enable the utilization of this storage system for actuating activities.

This function is realized by means of the characteristic features of embodiments set forth herein.

According to the present invention "actuators" are functions from the field of regulation and control.

The invention accordingly relates to a system for the utilization of alternating mechanical force or torque, which is suitable for the conversion of force or torque into oscillating movements, the system having a device that is able, on the one hand, to produce hysteresis with a minimum of one spring and appropriate gearing elements, and, on the other hand, to accumulate and conserve these hysteresis movements and finally make them available for mechanical movements.

The present invention relates to a system that can be used for the storage and use of mechanical work or rope segments for actuating activity. This is achieved by means of devices related to the present invention.

In a preferred embodiment of the device according to the present invention a system is envisaged by which a minimum of one spring as well as gearing elements are arranged in such a way that, with increasing force or torque, changes in length and angle brought about at the force and torque input point of a spring are transmittable against force or torque direction to the opposing contact point. Depending on the selected embodiment of the device, the opposing contact point of the force or torque of a spring is either fixed or not fixed to the housing.

According to the present invention, a mechanical and/or hydraulic and/or pneumatic gear is envisaged for transmitting force to the spring, whereby a mechanical gear is also designed, dependent on the selected embodiment, as an epicyclic or planet gear that transfers force or torque by means of friction or toothing.

With the system according to the present invention ratchets, overrunning clutches and non-return valves are envisaged as part of gearing elements. It is further envisaged that ratchets, overrunning clutches and non-return valves be arranged in such a way that, following a cycle of increasing and decreasing load, either the distance between the opposing force contact point of the spring is changeable against force direction, or the opposing torque contact point of the spring is rotatable against torque rotational direction.

According to the present invention the spring, onto which force is transmitted, is defined as a mechanical spring and/or gas spring and/or the spring effect between magnets, with these acting as linear or torsion springs.

A system according to the invention is further envisaged, by which a storage system comprising a rope drum and a second rope drum on the same axis, or alternatively two storage systems, each having a rope drum on the same axis, coils both ends of a rope in inverse directions, this rope being connected to a hauling rope by means of a deflection pulley. According to the present invention synchronization of the rope drums is achieved by connecting these by way of a reverse gear unit to a spring that is suitable for the storage of rotational activity.

It is further envisaged that a system according to the present invention has a drive for transmitting mechanical movements, with the output shaft, dependent on the selected embodiment, being equipped with a minimum of one activatable slipping clutch or other clutch, In another embodiment of the system according to the present invention this is designed in such a way that it is attachable as a module to a rope, which is fixed at both ends, and is suitable for the symmetrical coiling of rope in front of and behind the module with oscillating loads.

The present invention further relates to a system for control and/or actuating activities by way of ropes, hawsers, chains or belts for tensile force, or by means of bending-resistant elements such as rods or gear racks for compressive forces, with control and actuating activities being carried out on kites or drag sails on seagoing ships and buoys. In addition, the present invention also relates to a system for driving at least one generator through the use of wave-related elevating and rotational movements resulting from changes in length or angle arising at the spring.

A further aspect of the present invention is a method for the utilization of alternating mechanical force of torque, with these being converted into oscillating movements through the use of springs and gearing elements, as a result of which hysteresis movements are produced that are accumulated, conserved and finally made available for mechanical movements.

In a preferred embodiment of the method according to the present invention a speed-changing gear, infinitely variable gear or hydraulic pumps or motors as well as hydraulic or pneumatic cylinders are used as gearing elements for realization.

With the method according to the present invention, changes in length or angle caused by alternating forces are transmitted by means of a spring or gearing elements to the force or torque contact point as well as against the force or torque direction to the opposing contact point of the spring. Changes in length or angle are preferably transmitted with diminishing force or torque solely to the force or torque contact point of the spring.

With the method according to the present invention ratchets, overrunning clutches and non-return valves are also used for the accumulation and storage of the produced hysteresis movements.

In a preferred embodiment of the method according to the present invention a reduction in the distance from the force contact point of the rope to the housing is effected by cyclic changes in tensile load ($\Delta F$); alternatively, an increase in the distance from the force contact point of the bending-resistant element to the housing is effected by cyclic changes in compressive load ($\Delta F$).

With the present invention, naturally occurring or actively supplied force is converted into oscillating movements and used, through the production of hysteresis, to store or directly convert these movements into actuating activity. Since the system according to the invention is mainly used for the storage of mechanical work through the creation of hysteresis, it is also designated as a system for the storage of hysteresis movements.

The following applies with functions where actuating forces increase proportional to tensile force: Actuating work is actuating force multiplied by actuating segment. When actuating force multiplied by the effective change in rope length is somewhat greater than the actuating work, only the effective change in rope length in proportion to the actuating segment can be used as actuation. Such actuation then functions independent of the magnitude of tensile force. Due to its design, it has high actuating torque and therefore requires no or few gearing steps.

For operation over a long period, the shortening of effective rope length that occurs at the place of actuation—on time-related average—has to match the lengthening of effective rope length required for actuation.

Oscillating tensile forces are used to shorten effective rope length, which work against a spring system and—by means of a lever mechanism, gearing, hydraulics or pneumatics—use part of the force to coil the rope. At each point of force reversal between increase and decrease or decrease and increase the new position is secured by ratchets, overrunning clutches or non-return valves, so that the rope segment gained in each case through cyclic changes in forces accumulate (that means: reduced effective rope length).

In order to do justice to the varied approach, reference will no longer be made to energy storage (with capacity expressed in Wh), but rather to rope storage (with capacity expressed in meters).

A force or torque acts on a spring. The end support of the spring is moved by increasing force or torque against the direction of force or torque by means of a lever mechanism, gearing, hydraulics or pneumatics. This occurs in predetermined proportion to the movement made by the spring at the force or torque contact point in the direction of force or torque. Automatic resumption of this movement with diminishing force or torque is prevented by a ratchet, overrunning clutch or non-return valve. When the force or torque has sufficiently decreased, the opposing point, at which the lever arm or the axis of the reversing toothed gear wheel is blocked, or the point at which hydraulics or pneumatics are blocked, is moved by spring force against force or torque. Resumption of this movement is also prevented by a ratchet, overrunning clutch or non-return valve.

In the case of pneumatics, gas can undertake not only force redirection but also the spring function.

Through several cycles of increasing force or torque combined with corresponding cycles of decreasing force or torque, a linear or rotational movement is repeatedly executed against effective force or torque.

The opposing movement, which is brought about by the coiling of the rope, can itself represent a direction of the desired actuation, load a spring—that stores mechanical work for later actuation—or store the gained rope segment for subsequent actuating work. Storage therefore occurs, for example, by coiling a rope against force or loading springs.

Actuating elements in the rotational direction of the uncoiling rope can be controlled by disengaging a clutch or ratchet on the rope drum. Actuating torque and force are produced through uncoiling with a given tensile force, and as a result actuating work is performed. Actuation against rotational direction is produced by means of a reverse gear unit with a bevel gear cage or planet carrier of an epicyclic gear (planet gear) that is clutched to the housing. Actuating torque can be used to support activation of the required clutches. Clutches or ratchets can be activated not only by remote control but also through linear or angular position, magnitudes of force or torque as well as speed, inertia or gravitational direction. The last mentioned is appropriate for the inherently stable flight of drag sails/kites.

Alternatively, two rope drums can be used, which coil in opposing directions, and whose rope is connected to the hauling rope by means of a deflection pulley. With actuation, clutching is effected in each case with the rope drum, which produces the desired rotational direction.

With this mechanism, a spring is loaded against effective force with each increase in force beyond a relative percentage, and rope is coiled by the spring against effective force with each decrease in force. This alone can suffice as actuating work, or, with uncoiling under tensile force, actuating force and torque can be employed as a driving mechanism.

POSSIBLE APPLICATIONS

The present invention can be employed, for example, for the utilization of wave energy. Every movement under seawater conditions over a long period is exposed to considerable stress as well as wear and tear. The shaft sealing of marine propulsion has proven its worth. The purpose is to convert the elevating movement of the buoy into the oscillating rotational movement of a drive shaft by means of a rope drum.

With buoy-type wave power plants use is made of the varied elevating motion—dependent on wave height—of a buoy moored to the sea floor. For this, connection to the seafloor should be as taut as possible and largely independent of tidal conditions. With a storage system according to the present invention the required pre-tension of the rope or chain to the sea floor can be constantly regulated, and with this system, the buoy can also be submerged for the purpose of storm protection. Flooding of buoy chambers for storm protection, and subsequent pumping out, are no longer necessary. Control of spring pre-tension can be carried out by means of a floater, which triggers the "wind in the sail" or "slacken sail" "function". Generators are operated parallel to the spring. With appropriate pre-tension exclusive spring operation is activated, so that the alternating rotational movement is converted hysteresis-free, by way of a reverse gear unit with corresponding overrunning clutches, into an equidirectional rotational movement and, for example, drives a generator.

In addition, the system according to the present invention can be applied for the control of kites. Kites are towed by at least one rope and require an adjustment mechanism to be actively flown. With the conventional realization of such actuators with electric gear motors, the period of operation is considerably restricted by storage-battery capacity, or it is dependent on the production of energy from environmental factors that cannot be influenced (such as sunshine with the use of solar cells).

Application of the system according to the present invention enables permanent active control of kites or drag sails with minimal expenditure of energy or weight, in particular with seagoing vessels. On the assumption that control force is proportional to tensile force, high control force arises with high tensile force, for which corresponding energy supply and actuators must be available. The system according to the present invention is therefore particularly advantageous in the case of such control systems, since it is able, independent of the magnitude of tensile force, to store a segment of rope and make available the required actuating force for control of the kite, even with extraordinary tensile force, such as with gusts of wind.

When installed on ships, the system according to the present invention also requires less coiling power for the hauling in of kites.

Furthermore, a number of individual units for the storage of hysteresis movements can haul in or slacken individual ropes by remote control, adjust line lengths and thus the aerodynamic form or angle of incidence of individual kite segments as well as perform reefing functions.

With the system according to the present invention skylights, ventilation flaps, rotary valves and blinds can be opened using just one line by means of alternating movements, and—by pulling the line as far as it will go, which releases movement in the other direction—closed, or correspondingly reversed.

With the system according to the present invention shading equipment—such as sunblinds or sunshades—can be automatically hauled in for storm protection using the variable forces of approaching wind.

With the system according to the present invention a gripper on a crane hook, which hangs on just one rope, can be repeatedly operated. Remote controlled interlocks and clutches can regulate an actuating system for opening and closing through the release of the stored hauling rope.

The system according to the present invention can make use of hysteresis in shock absorbers as energy, which is wasted in traditional shock absorbers. The automatic level control of vehicles with varied loads is a further possible application. For example, the ground clearance of vehicles and trailers with varying loads can also be automatically adjusted.

In conclusion, further possible applications of the system according to the present invention for the storage of hysteresis movements and their utilization in sailing include installation in a sail winch, which enables sheet ropes to be tightened under high tensile force with fluctuating load without corresponding manual power. The possibility also exists to use fluctuating pre-tension in the luff or leech for the trimming of masts.

Automatic shifting of ballast through gravity-controlled clutches can also be carried out for the purpose of trimming with the system under consideration.

With the system for the storage of hysteresis movements and their further utilization according to the present invention extremely high tensile force can be produced through lateral force on the taut rope. That way, a device according to the present invention is suitable for taking up slack in high-voltage power lines and overhead railway lines for the purpose of compensating fluctuations in cable pre-tension resulting from seasonal changes in temperature.

The system for the storage of hysteresis movements and their further utilization according to the present invention can make use of the oscillating tensile force of a fish on a fishing rod to land the fish.

With the system for the storage of hysteresis movements according to the present invention loads along a rope or carrier can be lifted by applying an additional oscillating force to the load.

The system according to the present invention can be integrated into clamping belts for the securing of loads, and results in automatic reclamping should the load loosen.

The system according to the present invention, when integrated into cable clips, can also bring about automatic pre-tension through cyclical pulling of the object to be secured.

The system according to the present invention is further suitable, through the additional application of cyclical loads, for adjusting the height of lamps, office chairs, desks and jacks as well as for variably relieving the weight of hand tools.

The system according to the present invention is also applicable as a hoisting system for mountaineers.

The system according to the present invention is suitable as a security system for lifts/elevators in the case of power failure, where people trapped inside can raise the lift/elevator to the next floor by jumping up and down.

With the system according to the present invention, it is possible to feed ropes or cables into empty pipes through cyclical pulling.

Further advantageous applications are described in the subclaims. The present invention is described on the basis of practical examples and the following drawings:

FIG. 1 Mechanical linear system for the storage of hysteresis movements and their utilization with ropes that are fixed at both ends, or with carriers for the lifting of loads.

FIG. 2 Mechanical linear system for the storage of hysteresis movements and their utilization with one rotational actuating direction.

FIG. 3 Mechanical rotational system for the storage of hysteresis movements and their utilization with a reverse gear unit and two rotational actuating directions FIG. 4 Hydraulic linear system for the storage of hysteresis movements and their utilization with mechanical storage of hysteresis movements and one actuating direction FIG. 5 Hydraulic linear system for the storage of hysteresis movements and their utilization with hydraulic storage of hysteresis movements and one actuating direction FIG. 6 Hydraulic rotational system for the storage of hysteresis movements and their utilization with one actuating direction FIG. 7 Pneumatic linear system for the storage of hysteresis movements and their utilization with mechanical storage of hysteresis movements and one actuating direction FIG. 8 Pneumatic linear system for the storage of hysteresis movements and their utilization with pneumatic storage of hysteresis movements and one actuating direction FIG. 9 Pneumatic rotational system for the storage of hysteresis movements and their utilization with one actuating direction FIG. 10 Rotational twin system for the storage of hysteresis movements and their utilization with two rotational actuating directions FIG. 11 Rotational system for the storage of hysteresis movements and their utilization with two rotational actuating directions for the control of kites/drag sails FIG. 12 Rotational system for the storage of hysteresis movements and their utilization for the adjustment of the length of ropes that are fixed at both ends FIG. 13 Rotational system for the storage of hysteresis movements for the compensation of water level with buoys and for the production of wave power FIG. 14 Cross section of overrunning clutches FIG. 15 Mechanical rotational system for the storage of hysteresis movements and their utilization, with torque being supplied by way of the outer ring gear and the spring attached to the planet carrier, with one rotational actuating direction FIG. 16 Mechanical rotational system for the storage of hysteresis movements and their utilization, with torque being supplied by way of the sun gear and the spring attached to the planet carrier, with one rotational actuating direction FIG. 17 Mechanical rotational system for the storage of hysteresis movements and their utilization, with torque being supplied by way of the planet carrier and the spring attached to the sun gear, with one rotational actuating direction FIG. 18 Mechanical rotational system for the storage of hysteresis movements and their utilization, with torque being supplied by way of the planet carrier and the spring attached to the outer ring gear, with one rotational actuating direction FIG. 19 Mechanical rotational system for the storage of hysteresis movements and their utilization with two rope drums of varied diameter and one rotational actuating direction FIG. 20 Mechanical rotational system for the storage of hysteresis movements and their utilization with recirculating ball screws, without actuating elements

BRIEF DESCRIPTION OF THE DRAWINGS

Each of the systems described below can be designed with corresponding gearing elements for actuation in both directions. For the purpose of clear description, actuating movement in both directions is shown only in FIGS. 3 and 10.

In the second half of the storage cycle high force [16] is applied in the initial position, which is decreased to low force [15]. The opposite block is held in position on the static rope [48] by means of the lower right ratchet [44a]. Following pre-determined hysteresis, the hauling rope [17] and the housing [18] are raised by the springs [23]. The lower left ratchet [44b] on the housing [18] is released. Through repetition of the cycle, the housing [18] is raised incrementally with the opposite block [59] against the direction of force.

On discharging the system, through the release of both ratchets [44a, 44b] the rope segment gained by the raising of the housing [18] is used.

Figure 1:
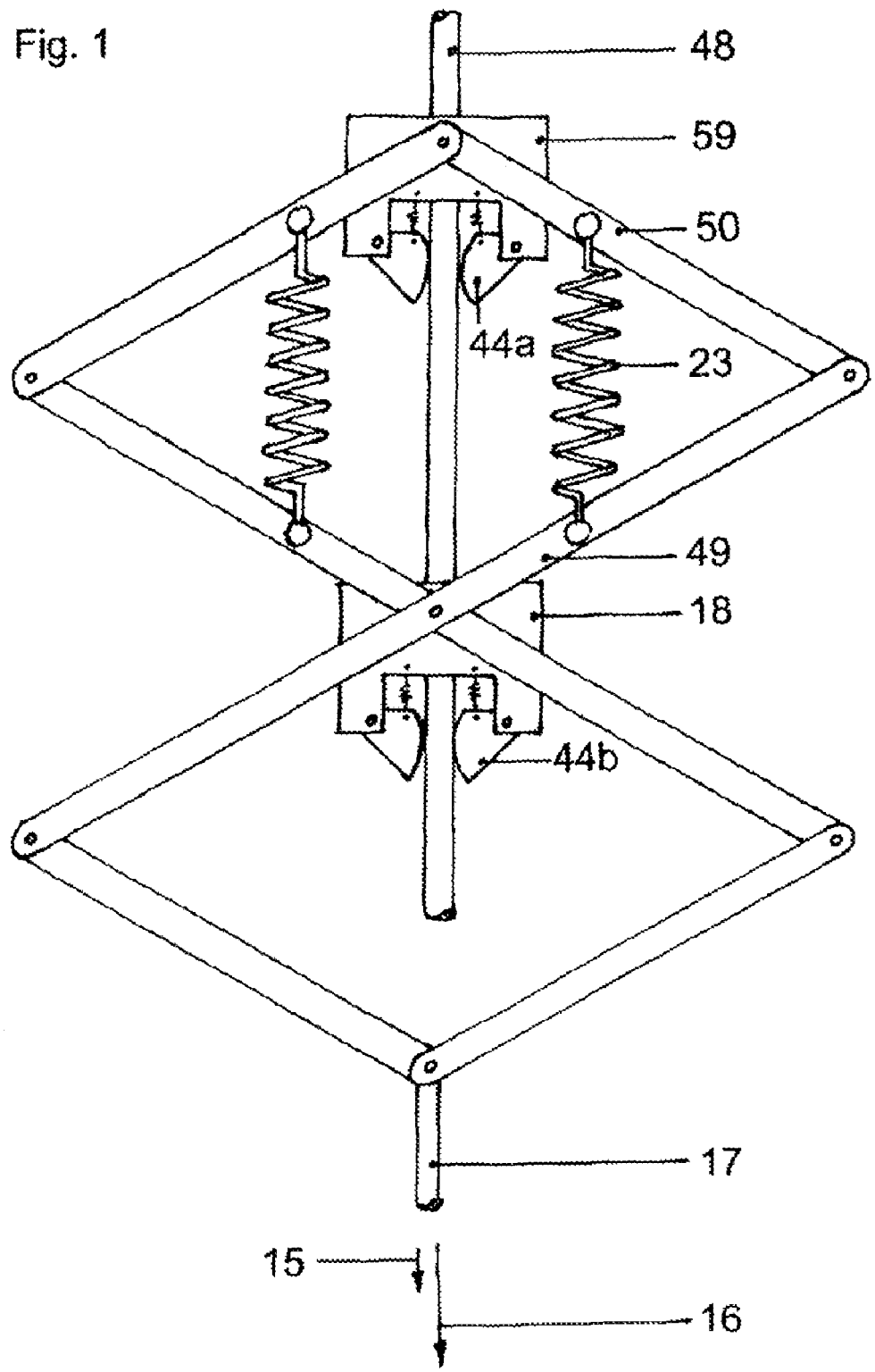
FIG. 1 shows a mechanical linear system according to the present invention for the storage of hysteresis movements and their utilization with ropes that are fixed at both ends, or with carriers for the lifting of loads. In the first half of the cycle for the storage of hysteresis movements, low force [15] is applied to the hauling rope [17] in the initial position. An increase to high force [16] results in blocking of the lower left ratchet [44b] of the housing [18] on the rope or carrier, and by means of levers [49] and connecting rods [50] the opposite block [59] is set in motion against the direction of force and loads the springs [23]. At the same time the lower right ratchet [44a] is released.
Figure 2:
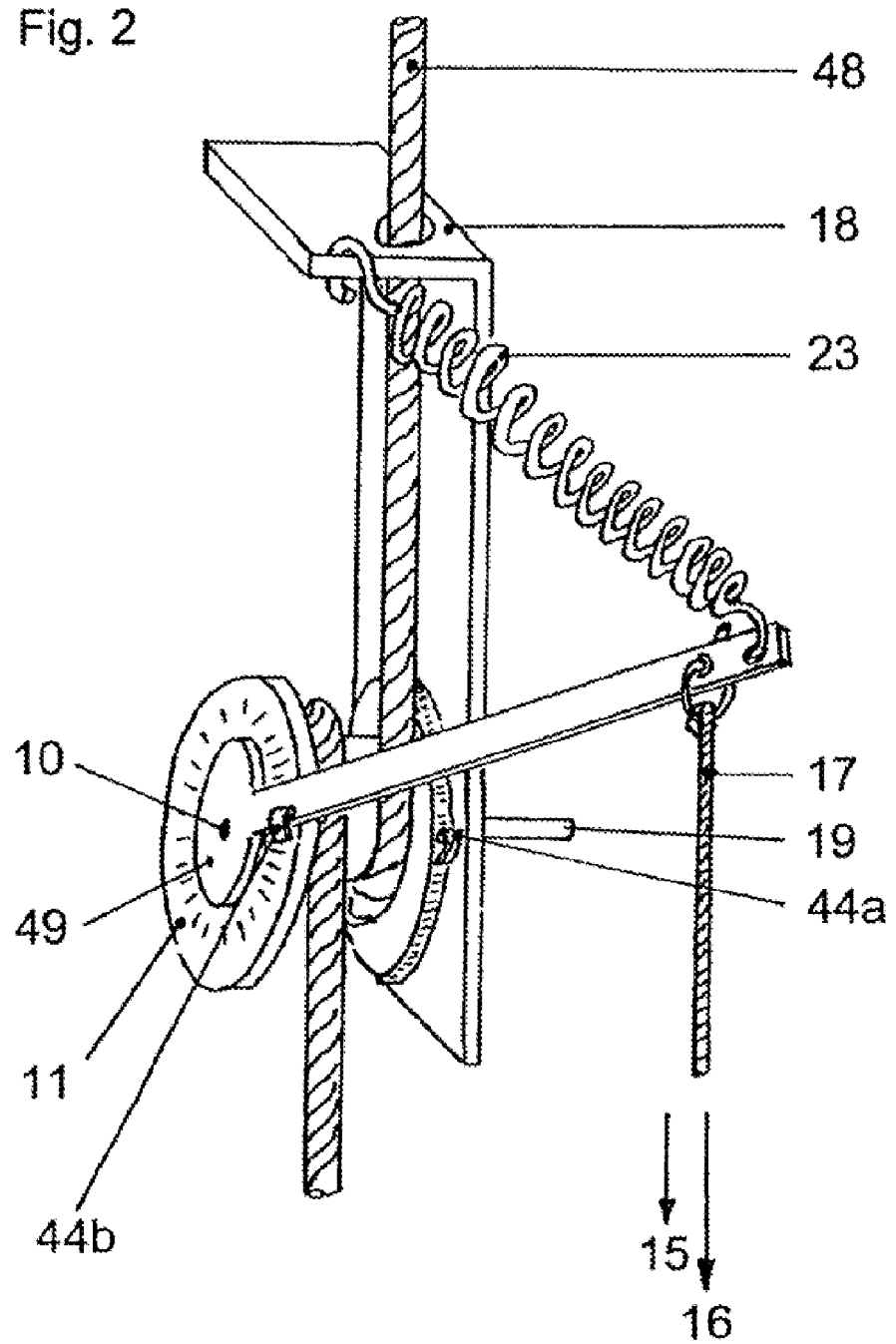

FIG. 2 shows a mechanical linear system according to the present invention for the storage of hysteresis movements with one rotational actuating direction. In the first half of the cycle for the storage of hysteresis movements low force [15] is applied to the hauling rope [17] in the initial position. Its increase to high force [16] results in clockwise rotation of the lever [49]. On account of the lower left ratchet [44b], which is fixed to the lever [49], the rope drum [11] (or toothed gear wheel) is accordingly moved, and the housing [18] on the static rope [48] (or a gear rack) is raised against the direction of force. At the same time, the lower right ratchet [44a], which is mounted on the housing [18], is released.

In the second half of the storage cycle high force [16] is applied in the initial position, which is then decreased [16→15]. The position of the rope drum [11] (or toothed gear wheel) is blocked by the lower right ratchet [44a] on the housing [18]. Following pre-determined hysteresis at high force [16] the spring [23] effects anticlockwise rotation of the lever arm [49]. The lower left ratchet [44b] on the lever arm [49] is released. Through repetition of the cycle, the housing [18] is raised incrementally together with the spring end-support against the direction of force.

On discharging the system, through the release of both ratchets [44a, 44b] either the rope segment gained by the raising of the housing [18] is used, or rotation around the axis [10] of the actuator to be engaged is brought about.

Figure 3:
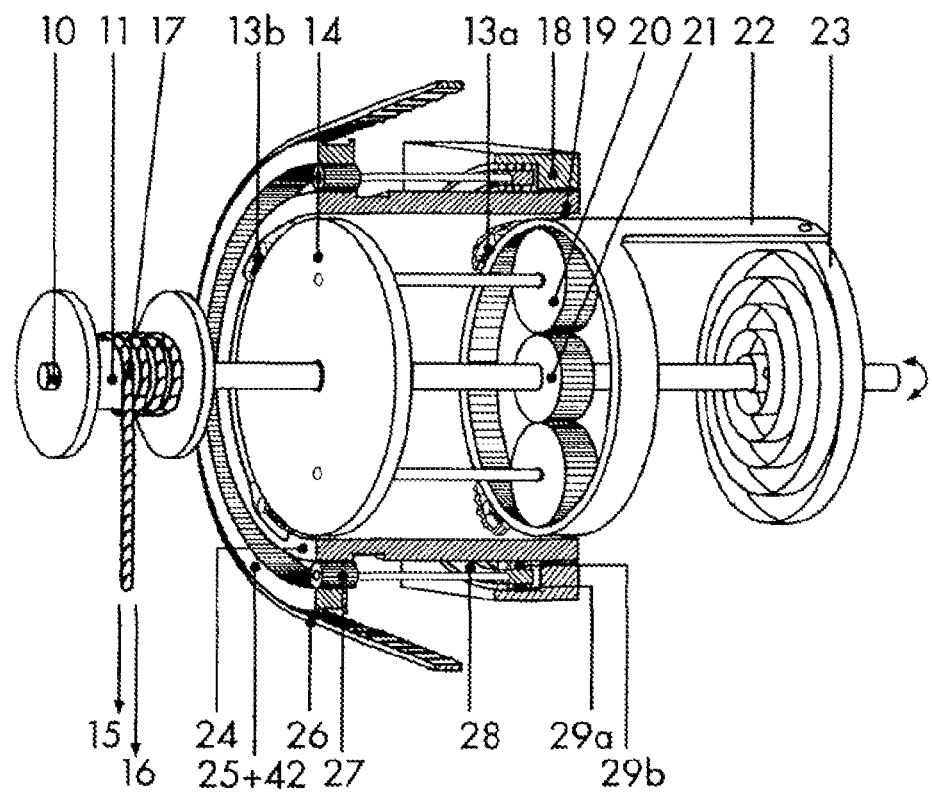

FIG. 3 shows a mechanical rotational system according to the present invention with a reverse gear unit and two rotational actuating directions. To load the rope drum, the planet carrier of the reverse gear unit [28] is coupled with the housing [18] by a clutch [29a] and with the actuator [19] by a clutch [29b]. In the first half of the storage cycle, low force [15] is applied to the hauling rope [17] in the initial position. With increased force [16] clockwise rotation of the rope drum [11] and the axis [10] is brought about. At the same time, the axis [10] attempts by means of the spring [23] to effect clockwise rotation of the outer ring [22] and planet carrier [14]. This is prevented by the overrunning clutches [13a, 13b]. As a result, because the planet carrier of the storage system [14] is blocked by the overrunning clutch [13b] the clockwise rotating sun gear [21] rotates the planet gear [20] in an anticlockwise direction, with the effect that the outer ring gear [22] likewise rotates in an anticlockwise direction. The angle of rotation of the spring [23] is determined by the sum of the clockwise rotation of the axis [10] and the anticlockwise rotation of the outer ring gear [22] of the storage system.

In the second half of the storage cycle, high force [16] is applied in the initial position, which is then decreased [15]. Due to pre-determined hysteresis at high force [16], anticlockwise rotation of the rope drum [11], the axis [10] and the sun gear [21] of the storage system occurs. The outer ring gear [22] of the storage system remains blocked by the overrunning clutch [13a]. As a result, anticlockwise rotation of the planet carrier [14] of the storage system occurs by means of the free-running overrunning clutch [13b]. Repetition of the cycle incrementally rotates the outer ring gear of the storage system [22] together with the spring end-support and results in coiling of the rope [17].

The actuator [19] and the sun gear of the reverse gear unit [24] are coupled. Discharging of the system can give rise to either a clockwise or an anticlockwise actuating movement.

With a clockwise actuating movement the clutch [29b] remains engaged and the second clutch [29a] is disengaged. The planet carrier of the reverse gear unit [28] is in this phase clutched with the actuator [19]. Tensile force causes clockwise rotation, as a result of which the actuator [19] and the outer ring of the reverse gear unit [25] are also rotated with the toothed belt disk [42] in a clockwise direction.

With an anticlockwise actuating motion, the clutch [29a] is engaged and the second clutch [29b] disengaged. The planet carrier of the reverse gear unit [28] is in this phase clutched with the housing [18]. Tensile force brings about clockwise rotation of the actuator [19] and the sun gear of the reverse gear unit [24], as a result of which anticlockwise rotation of the planet gears of the reverse gear unit [27] and anticlockwise rotation of the outer ring of the reverse gear unit [25] with the toothed belt disk [42] follows.

Figure 4:
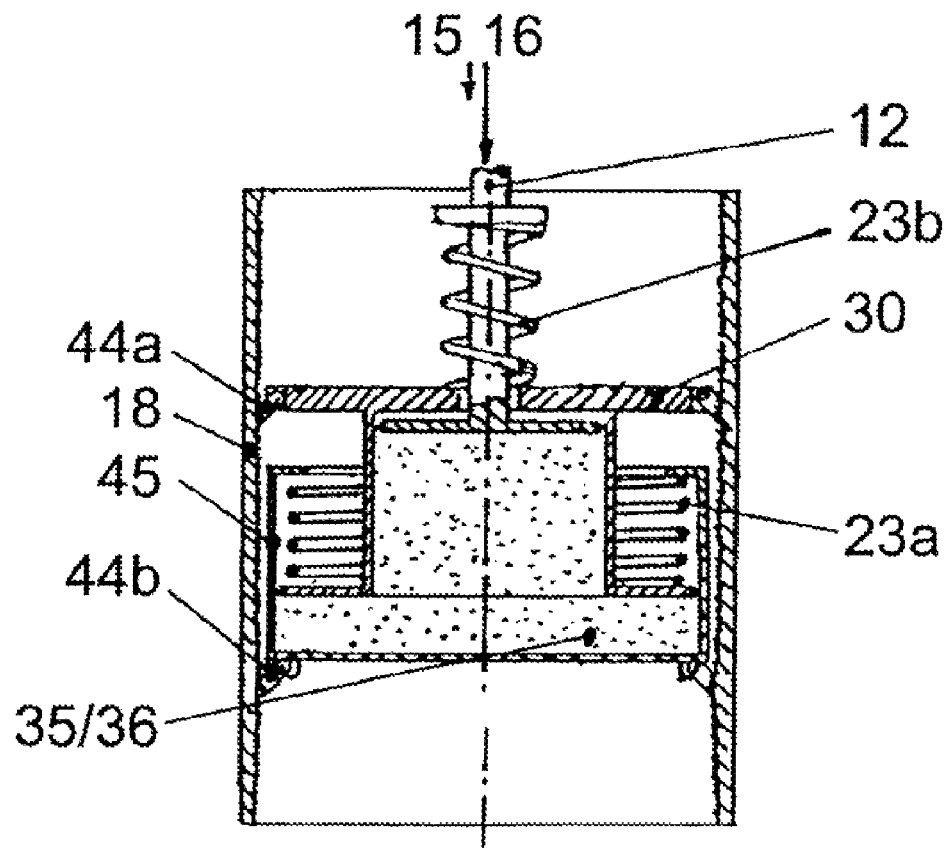

FIG. 4 shows a hydraulic linear system according to the present invention with mechanical storage of hysteresis movements and one actuating direction. The piston [12] operates in a cylinder-piston combination [30], which for its part fulfils the function of the piston in the large cylinder [45]. When force increases [15→16], the piston [12] in the cylinder-piston combination [30] drops, hydraulic pressure increases on the inner hydraulic chamber [35] beneath it, which is connected to the outer hydraulic chamber [36]. The large cylinder [45] is blocked by the lower left ratchet [44b] on the housing [18], so that equilibrium of force arises between the hydraulic chambers [35, 36] and the springs [23a, 23b]. During this, the cylinder-piston combination [30] rises against the direction of increased force [16].

When force decreases [16→15], pressure on the hydraulic chambers [35, 36] also decreases. The cylinder-piston combination [30] is now blocked by the lower right ratchet [44a] on the housing [18], and equilibrium of force must again arise between the hydraulic chambers [35, 36] and the springs [23a, 23b]. The outer spring [23b] accordingly raises the piston [12], and the inner spring [23a] raises the large cylinder [45]. With several cycles of changing force the large cylinder [45] and the cylinder-piston combination [30] move intermittently against the direction of force impact. Actuation can follow through the release of the ratchets [44a, 44b].

Figure 5:
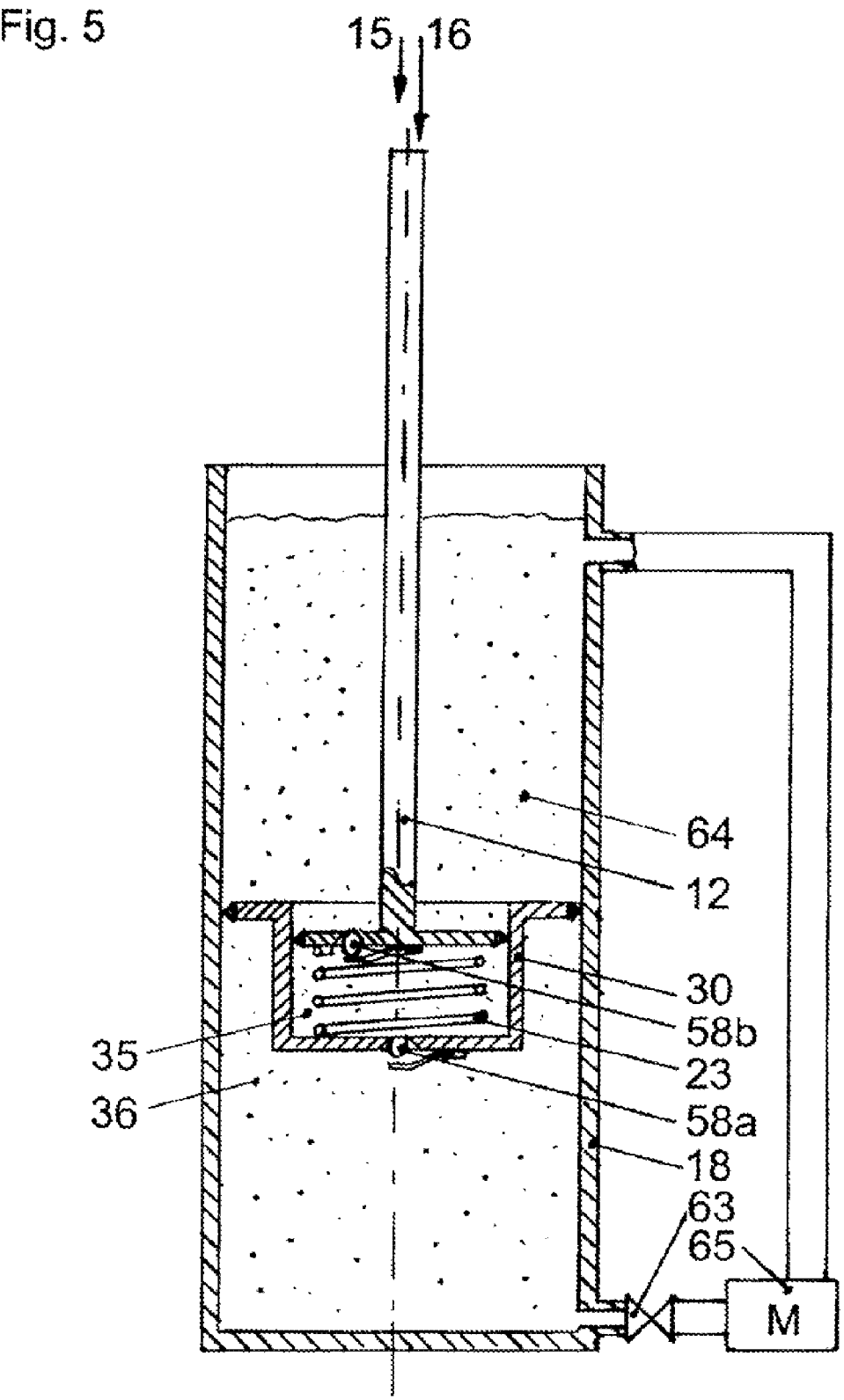

FIG. 5 shows a hydraulic linear system according to the present invention with hydraulic storage of hysteresis movements and one actuating direction. The piston [12] moves in the cylinder-piston combination [30], which for its part fulfils the function of the cylinder in the housing [18]. When force increases [15→16], the piston [12] in the cylinder [30] drops, hydraulic pressure increases on the inner hydraulic chamber [35] beneath it, which conveys hydraulic fluid through the non-return valve [58a] into the outer hydraulic chamber [36]. During this, the cylinder-piston combination [30] rises against the direction of increased force [16], until equilibrium of force exists between the spring [23] combined with pressure in the hydraulic chambers [35, 36] multiplied by the piston area of [12] and pressure in the hydraulic chambers [35, 36] multiplied by the piston area of [30].

When force decreases [16→15], the piston [12] is raised by the spring [23], pressure in the inner hydraulic chamber [35] drops and the volume is filled from the hydraulic fluid reserve [64] through the non-return valve [58b]. The cylinder-piston combination [30] is restricted by the incompressible volume in chamber [36]. With several cycles of changing force the piston [12] and the cylinder-piston combination [30] move intermittently against the direction of force impact.

Actuation can occur through the opening of the valve [63] by means of a hydraulic motor [65] or directly through the sinking of the piston [12].

Figure 6:
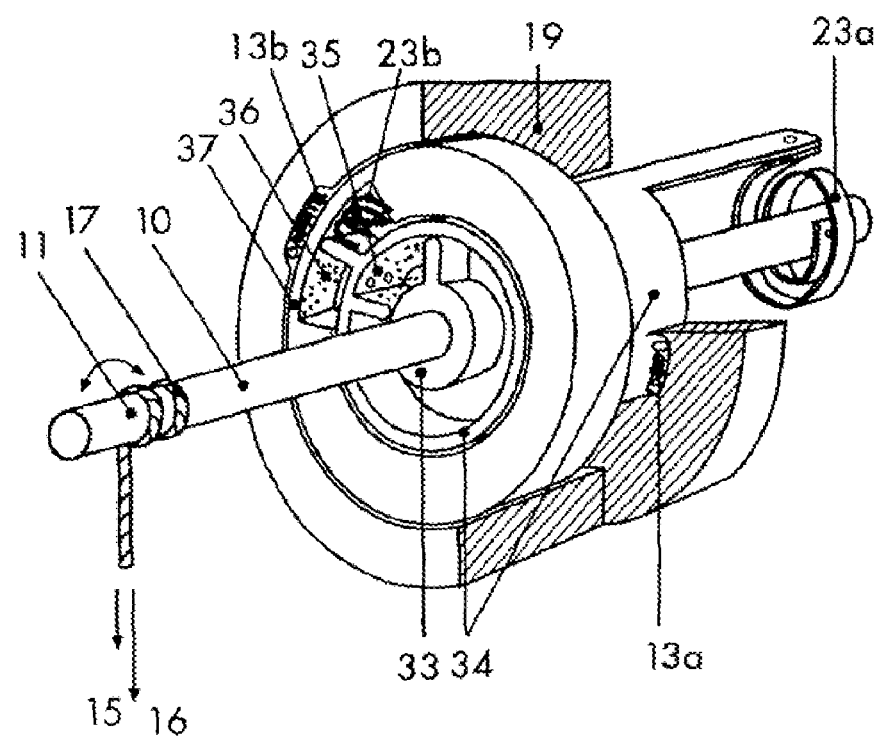

FIG. 6 shows a hydraulic rotating system according to the present invention with mechanical rotational storage of hysteresis movements and one actuating direction. During coiling of the rope drum [11], low force [15] is applied to the hauling rope [17] in the first half of the cycle. With an increase in force [16] anticlockwise rotation of the rope drum [11] and the axis [10] occurs. During this, the axis [10] and the inner hydraulic body [33] attempt to effect, by means of hydraulic fluid, anticlockwise rotation of the hydraulic ring [34] and the outer hydraulic body [37]. This is prevented by the overrunning clutch [13b]. Because the inner hydraulic chamber [35] is connected to the outer hydraulic chamber [36], the hydraulic ring [34] rotates clockwise against the force of the springs [23a, 23b]. That way, the spring [23a] is loaded, but with the effect that the end support [34] has rotated against torque direction.

In the second half of the cycle, increased force [16] is applied in the initial position, which is then decreased [15]. Following pre-determined hysteresis at increased force [16] clockwise rotation of the rope drum [11], the axis [10] and the inner hydraulic body [33] occurs. The spring [23b] effects clockwise rotation of the outer hydraulic body [37], since the hydraulic ring [34] is blocked by the overrunning clutch [13a]. Repetition of the cycle incrementally rotates the outer hydraulic body [37] and the inner hydraulic body [33] in a clockwise direction, resulting in coiling of the rope [17].

FIG. 6 shows only storage of hysteresis movements. Actuation can be realized, analogous to FIG. 3, through anticlockwise rotation of the actuator [19].

Figure 7:
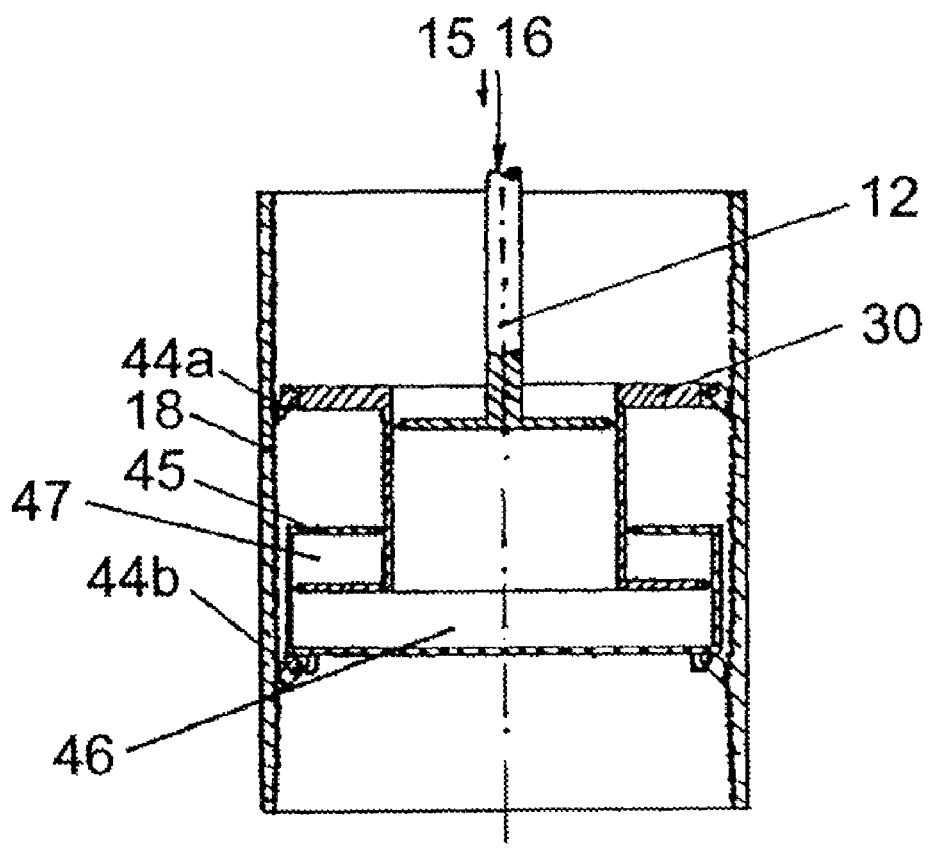

FIG. 7 shows a pneumatic linear system according to the present invention with mechanical storage of hysteresis movements and one actuating direction. When the applied force is increased [15→16], the piston [12] drops and increases the pressure on the first chamber [46] beneath it. The cylinder [45] is blocked by the lower ratchets [44b] on the housing [18]. Identical pressure has to prevail between the first chamber [46] and the second chamber [47]. For this reason, the cylinder-piston combination [30] rises against the direction of piston movement [12].

When applied force decreases [16→15] the piston [12] rises and pressure on the first chamber [46] beneath it falls. The cylinder-piston combination [30] is blocked by the upper ratchets [44a] on the housing [18]. For the purpose of pressure compensation vis-à-vis the first chamber [46] increased pressure in the second chamber [47] raises the cylinder [45]. With several cycles of changing force the cylinder [45] and the cylinder-piston combination [30] move intermittently against the direction of force input.

The embodiment shown in the figure functions without a mechanical spring, and shows the mode of operation solely with the effect of a gas spring, which is also the means of transmittance for the counter movement. In order to provide an optimum solution for the task set, a combination of a gas spring with a conventional spring can be useful. Actuation can take place through release of the ratchets [44a, 44b].

Figure 8:
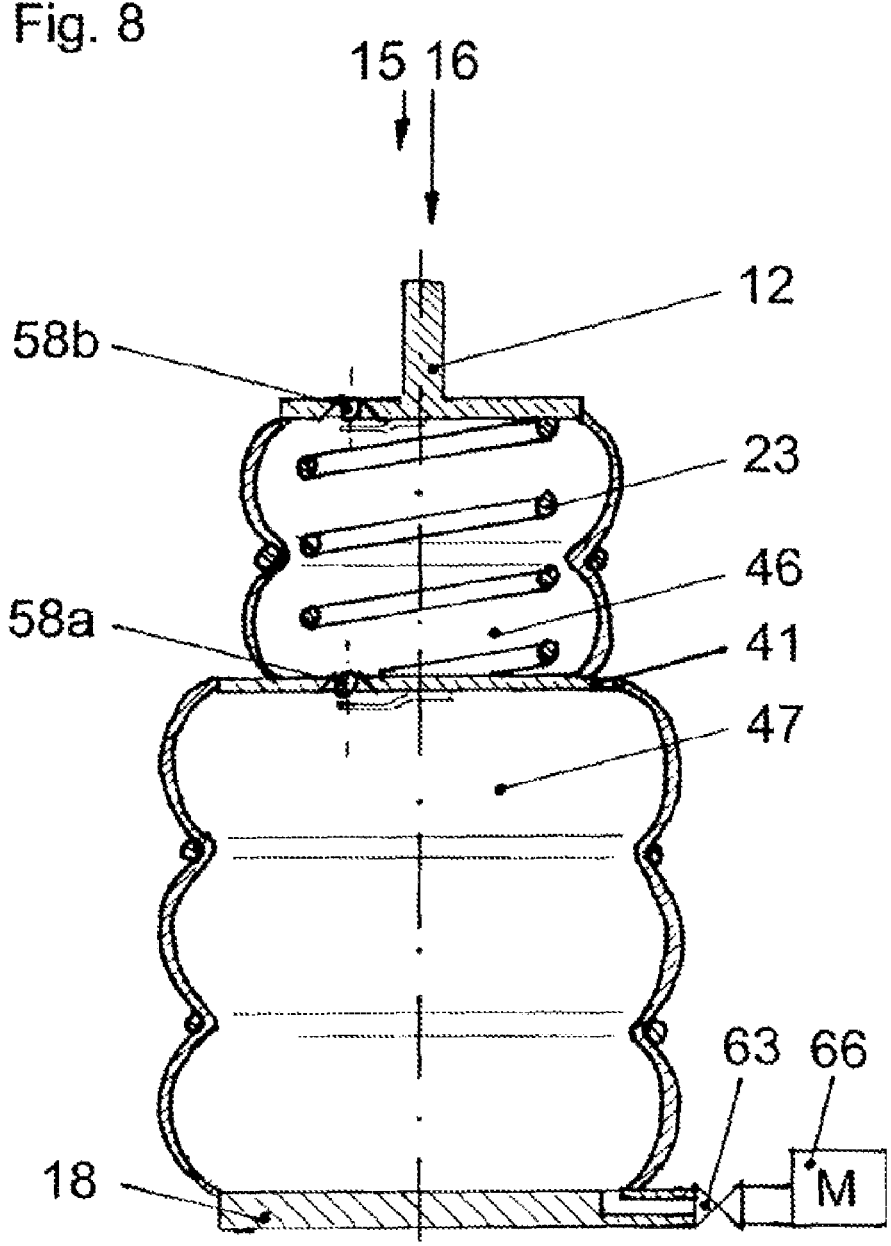

FIG. 8 shows a pneumatic linear system according to the present invention with pneumatic storage of hysteresis movements and one actuating direction. When the applied force increases [15→16] the piston [12] drops and increases the pressure on the first chamber [46] beneath it. The second chamber [47] has a larger diameter, takes in gas through the non-return valve [58a] and at the same time raises the chamber separation plate [41] against the direction of force, until the force of the second chamber [47] equals the sum of the force of chamber [46] and spring force [23].

When force drops [16→15] the piston [12] and, proportionally, the chamber separation plate [41] rise, and pressure in both chambers [46, 47] falls. When, due to proportional spring force [23], the pressure in the first chamber [46] drops under ambient pressure, air flows through the non-return valve [58b]. Following several cycles of changing force the chamber separation plate [41] and the piston [12] move intermittently against the direction of force input.

Actuation can be realized by opening the valve [63] with a compressed-air motor [66] or directly through the sinking of the piston [12].

Figure 9:
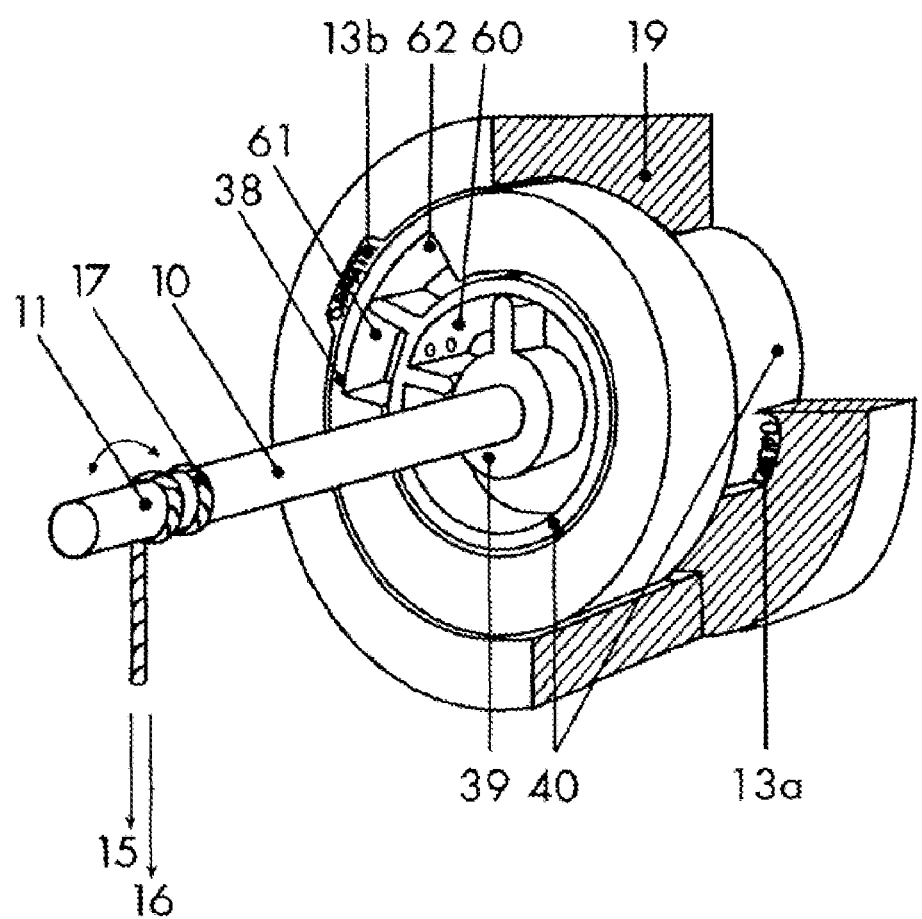

FIG. 9 shows a pneumatic rotating system according to the present invention with mechanical rotational storage of hysteresis movements and one actuating direction. In the first half of the rope-drum coiling cycle low force [15] is applied to the hauling rope [17] in the initial position. An increase in force [16] results in anticlockwise rotation of the rope drum [11], the axis [10] and the inner pneumatic body [39], which then, with increasing internal pressure, attempts to effect anticlockwise rotation of the pneumatic ring [40] and the outer pneumatic body [38]. This is prevented by the overrunning clutch [13b]. The result is that pressure rises not only in the inner pneumatic chamber [60] but also in the connected first outer pneumatic chamber [61]. That way, the pneumatic ring [40] rotates so long in a clockwise direction until the anticlockwise torque resulting from pressure multiplied by lever arm [60] and the pressure in the second outer pneumatic chamber [62] is equivalent to the corresponding clockwise torque in the first outer pneumatic chamber [61]. During this, the inner pneumatic chamber [60], the first outer pneumatic chamber [61] and the second outer pneumatic chamber [62] assume the function of gas springs.

In the second half of the cycle, during coiling of the rope drum, high force [16] is applied in the initial position, which is then decreased [15]. Following pre-determined hysteresis clockwise rotation of the rope drum [11], axis [10] and inner pneumatic body [39] occurs. The result is clockwise rotation of the outer pneumatic body [38], since pressure in the second outer pneumatic chamber [62] is now greater than pressure in the inner pneumatic chamber [60] and the first outer pneumatic chamber [61], and the overrunning clutch [13a] prevents anticlockwise rotation of the pneumatic ring [40].

Repetition of the cycle incrementally rotates the outer pneumatic body [38] and the pneumatic ring [40] in a clockwise direction and results in coiling of the rope [17].

FIG. 9 merely shows storage of hysteresis movements. Actuation through anticlockwise rotation of the actuator [19] can be realized analogous to FIG. 3.

Figure 10:
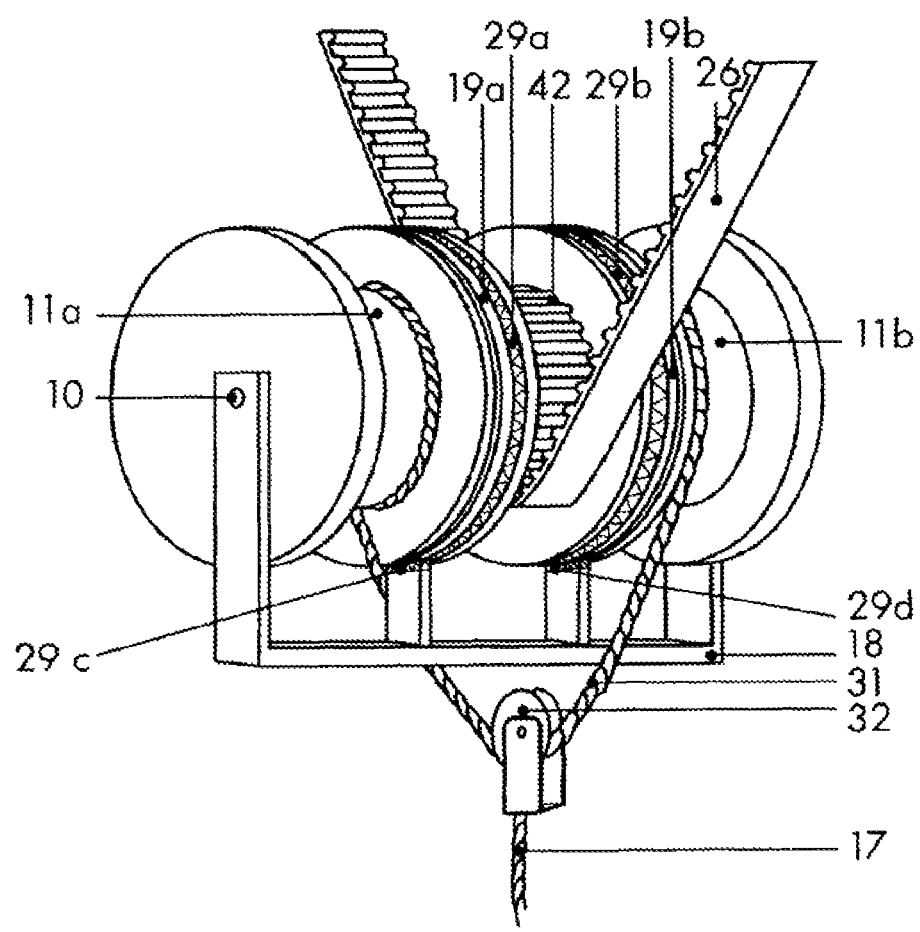

FIG. 10 shows a rotating twin system according to the present invention with mechanical rotational storage of hysteresis movements and two actuating directions. Elements of the storage of hysteresis movements are integrated into rope drums [11a, 11b] and are not shown. Only the actuator units [19a, 19b] and clutches for anticlockwise [29a] and clockwise rotation [29b]—both connected to the toothed belt disk [42]—are shown, as well as the lower right clutch [29c] between the housing [18] and the actuator [19a] for anticlockwise rotation and the lower left clutch [29d] between the housing [18] and the actuator [19b] for clockwise rotation of the toothed belt disk [42].

The hauling rope [17] is attached to a deflection pulley [32], through which a compensating rope is fed, which is coiled in opposite directions onto the rope drums [11a, 11b].

When all clutches [29a, 29b, 29c, 29d] are locked the system operates in the mode "coil rope drum". For anticlockwise rotation of actuating elements two clutches [29a, 29d] are closed and the other two clutches [29b, 29c] are opened. For clockwise rotation, a different combination of clutches is closed [29b, 29c] and opened [29a, 29d].

Both rope drums can be connected by a reverse gear unit to regulate coiling with a balanced quantity of rope on both rope drums.

Figure 11:
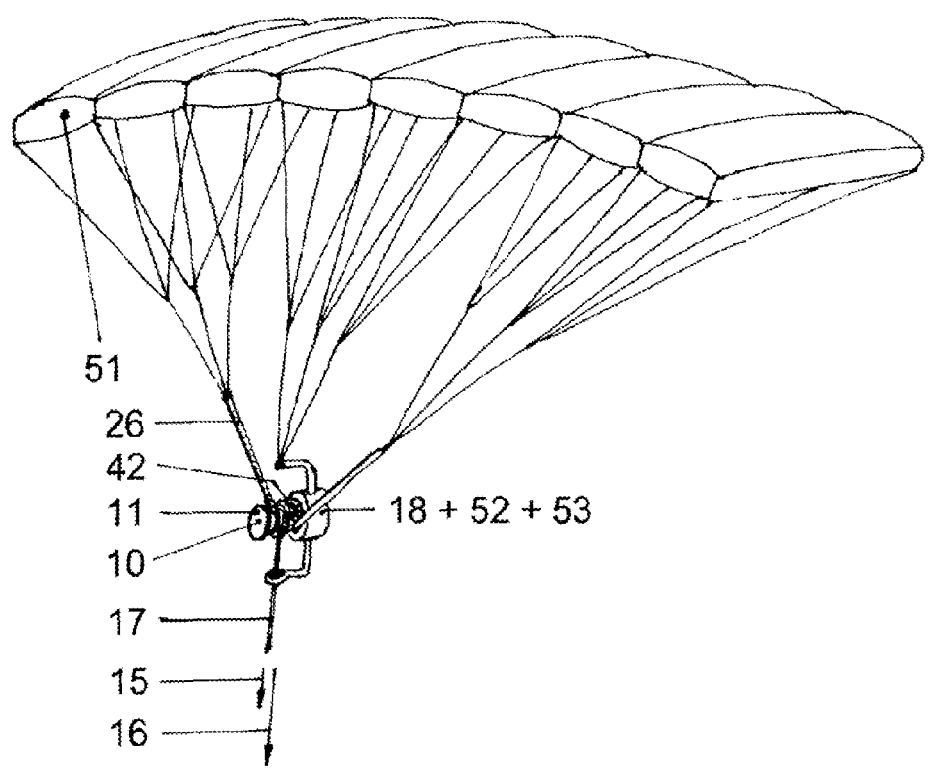

FIG. 11 shows control of a kite/drag sail through an mechanical rotating system according to the present invention with a reverse gear unit, analogous to FIG. 3, as a complete system. Here, the kite/drag sail [51] is shown. This is attached to the housing [18] by means of a number of collected individual lines, and also to towing lines by means of a toothed belt [26]. The module for the storage of hysteresis movements [52] is loaded by means of oscillating forces [15, 16] on the hauling rope [17], and at the same time the rope is stored on a rope drum [11]. Actuating movements are fed from the rope drum [11] and used in both directions by way of a reverse gear unit [53] and a toothed belt disk [42] to control the drag sail.

Figure 12:
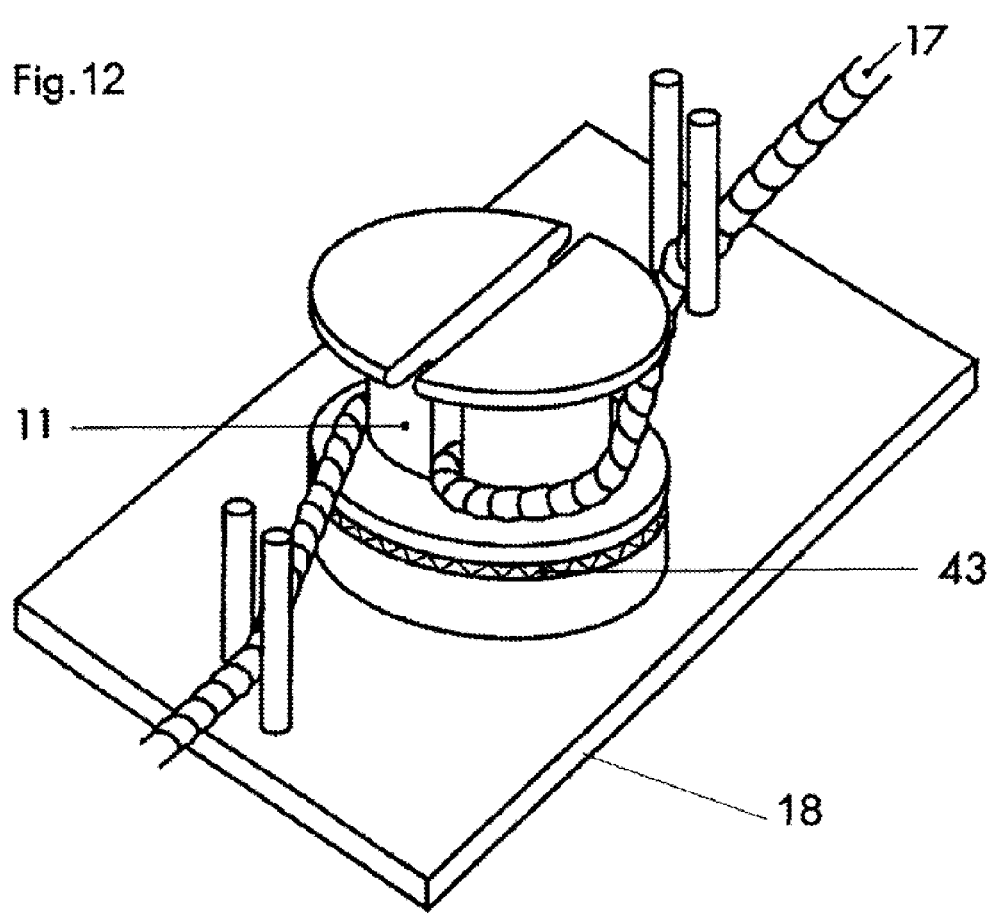

FIG. 12 shows a system according to the present invention for ropes fixed at both ends. This system integrates the device for the storage of hysteresis movements into or under the rope drum [11]. With oscillating forces the rope [17] is intermittently hauled in symmetrically. When a preset force is exceeded, a slipping clutch [43] slackens the rope.

Figure 13:
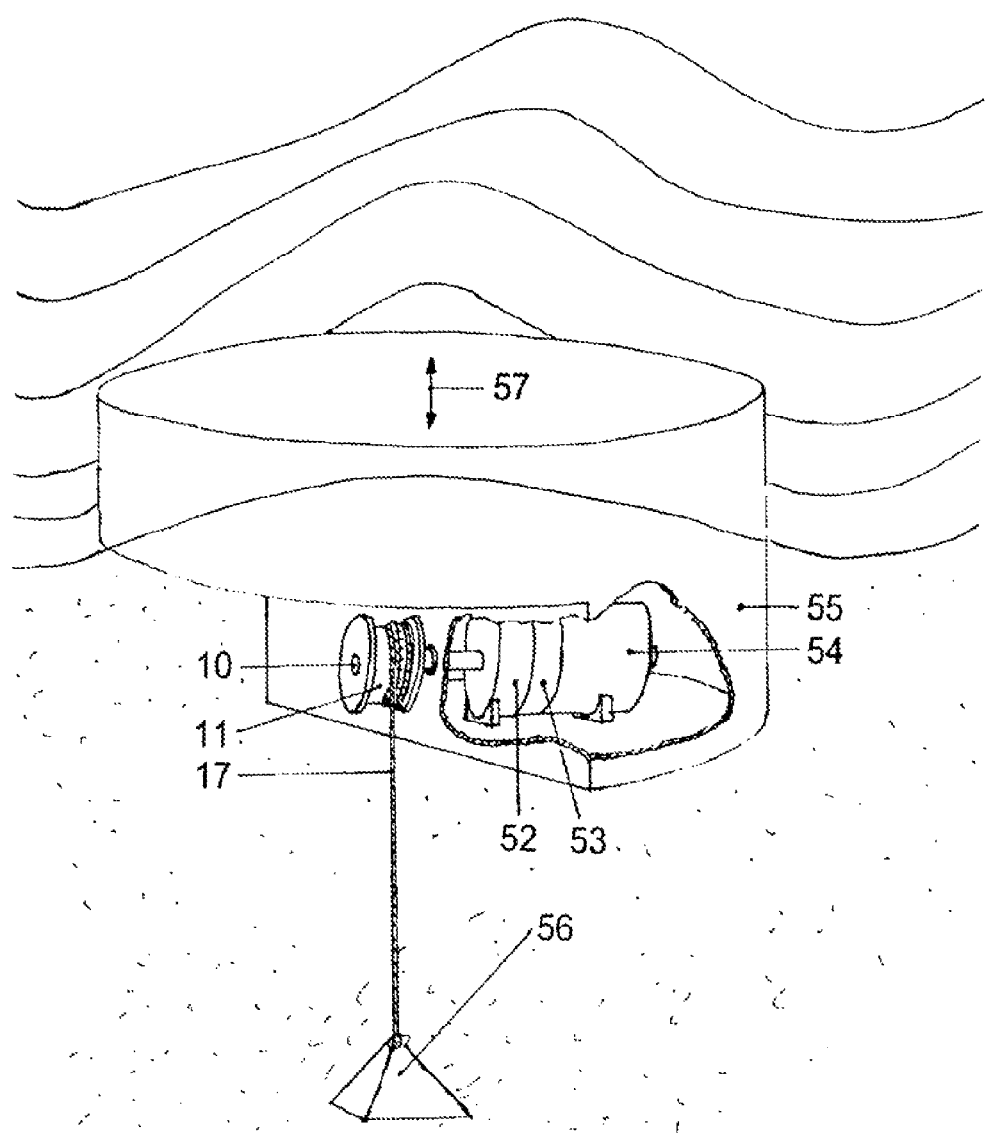

FIG. 13 shows a mechanical rotating system according to the present invention on a buoy or wave power plant, which sets rope tension. The buoy [55] is anchored to the seabed [56]. By means of a rope [17] and a rope drum [11] rotational movement is transferred through the wave-related movement of the buoy [57] by means of a shaft [10] into the buoy interior. The water-line is controlled by means of an activatable system for the storage of hysteresis movements [52], and the oscillating rotational movement is converted by a reverse gear unit [53] with integrated overrunning clutch into rotation in a single direction and drives a generator [54].

Figure 14:
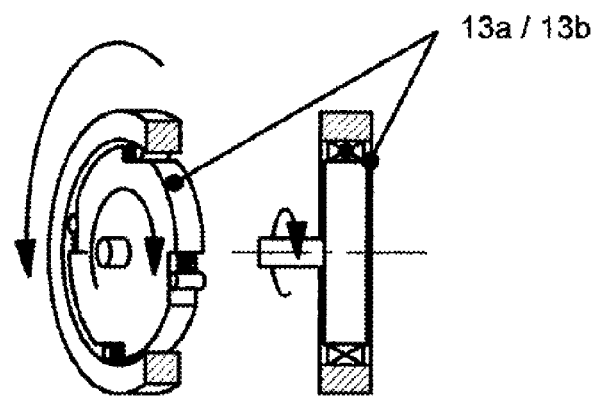

FIG. 14 shows a cross section of overrunning clutches [13a, 13b]. When the outer ring gear is not moved, the inner part can execute clockwise rotation. In the cross section, the position at which the inner part would move towards the observer is marked with "X" and "●". The position at which the inner part would move away from the observer is marked with "X".

Figure 15:
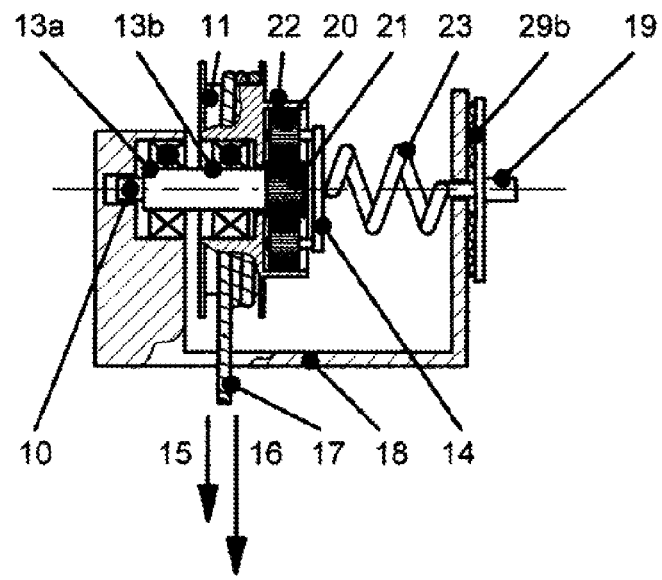

FIG. 15 shows a mechanical rotating system according to the present invention, with torque being supplied by way of the outer ring gear and the spring attached to the planet carrier, with one rotational actuating direction. To enable loading of the rope drum, the actuator [19] is coupled by the clutch [29b] with the housing [18]. In the first half of the storage cycle, low force [15] is applied to the hauling rope [17] in the initial position. An increase to high force [16] gives effect to clockwise rotation of the rope drum [11], the outer ring gear [22] of the storage system and the axis [10], which is coupled with the overrunning clutch [13b]. At the same time, the torsion spring [23] is loaded by way of the planet gear [20] and the planet carrier [14].

In the second half of the storage cycle, high force [16] is applied in the initial position. This then decreases to low force [15]. Following pre-determined hysteresis at high force [16] anticlockwise rotation of the rope drum [11] occurs. This anticlockwise rotation is effected by the torsion spring [23], which attempts by means of the planet carrier [14] and the planet gears [20] to effect anticlockwise rotation of the outer ring [22] and/or the sun gear [21]. Anticlockwise rotation of the sun gear [21] is prevented by the overrunning clutch [13a], which is coupled to the housing [18]. This way, the angle of anticlockwise rotation of the outer ring [22], which is connected to the rope drum [11], is increased compared to the angle of anticlockwise rotation of the spring [23].

Through repetition of the cycle the rope drum [11] is rotated incrementally in an anticlockwise direction and coiling of the rope [17] occurs. Through disengagement of the clutch [29b] tensile force [15, 16] gives rise to clockwise rotation of the actuator [19].

Figure 16:
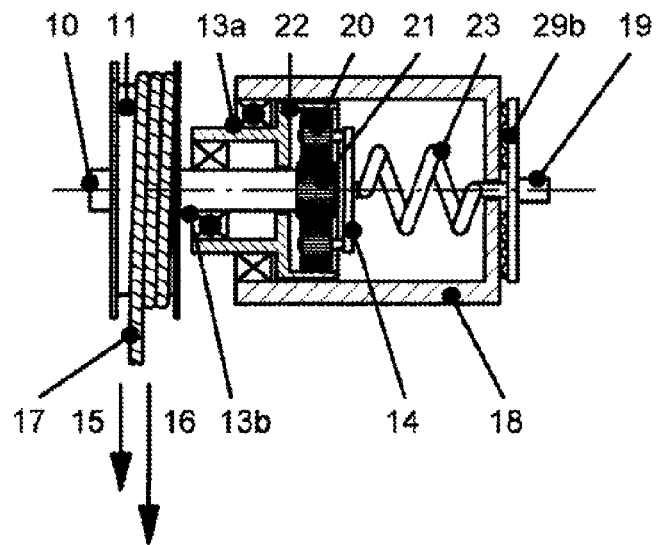

FIG. 16 shows a mechanical rotational system according to the present invention, with torque being supplied by way of the sun gear and the spring attached to the planet carrier, with one rotational actuating direction. To enable loading of the rope drum, the actuator [19] is coupled by the clutch [29b] with the housing [18]. In the first half of the storage cycle low force [15] is applied to the hauling rope [17] in the initial position. An increase to high force [16] brings about clockwise rotation of the rope drum [11] and the sun gear [21] as well as of the outer ring [99], which is coupled by the overrunning clutch [13b]. At the same time, the torsion spring [23] is loaded by way of the planet gears [20] and the planet carrier [20].

In the second half of the storage cycle high force [16] is applied in the initial position. This decreases to low force [15]. Following pre-determined hysteresis at high force [16] anticlockwise rotation of the rope drum [11] occurs. This anticlockwise rotation is effected by the torsion spring [23], which attempts by way of the planet carrier [14] and the planet gears [20] to effect anticlockwise rotation of the outer ring [22] and/or the sun gear [21]. Anticlockwise rotation of the outer ring [22] is prevented by the overrunning clutch [13a], which is coupled to the housing [18]. This way, the angle of anticlockwise rotation of the sun gear [22], which is connected to the rope drum [11], is increased compared to the angle of anticlockwise rotation of the spring [23].

Through repetition of the cycle, the rope drum [11] is rotated incrementally in an anticlockwise direction and coiling of the rope [17] results.

Through disengagement of the clutch [29b], tensile force [15, 16] gives rise to clockwise rotation of the actuator [19].

Figure 17:
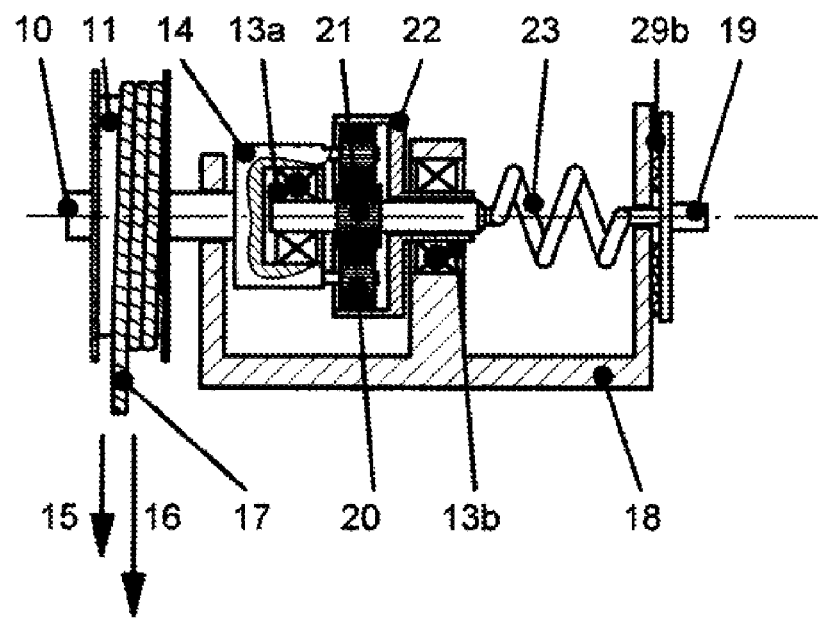

FIG. 17 shows a mechanical rotational system according to the present invention, with torque being supplied by way of the planet carrier and the spring attached to the sun gear, with one actuating direction. To enable loading of the rope drum, the actuator [19] is coupled by the clutch [29b] with the housing [18]. In the first half of the storage cycle low force [15] is applied to the hauling rope [17] in the initial position. An increase to high force [16] gives rise to clockwise rotation of the rope drum [11] and the planet carrier [14]. Clockwise rotation of the outer ring [23] is prevented by the overrunning clutch [13b]. As a result, the sun gear [21] connected to the torsion spring [23] rotates clockwise at a greater angle and overruns with the overrunning clutch [13a] the planet carrier [14].

In the second half of the storage cycle high force [16] is applied in the initial position. This decreases to low force [15]. Following pre-determined hysteresis at high force [16] anticlockwise rotation of the rope drum [11] occurs. This anticlockwise rotation is effected by the torsion spring [23], which, through the engaged overrunning clutch [13a], directly rotates the rope drum [11] in an anticlockwise direction, and at the same time rotates the outer ring [23] in an anticlockwise direction, which now runs free through the overrunning clutch [13b].

Through repetition of the cycle the rope drum [11] is rotated incrementally in an anticlockwise direction and coiling of the rope [17] occurs.

Through disengagement of the clutch [29b] tensile force [15, 16] gives rise to clockwise rotation of the actuator [19].

Figure 18:
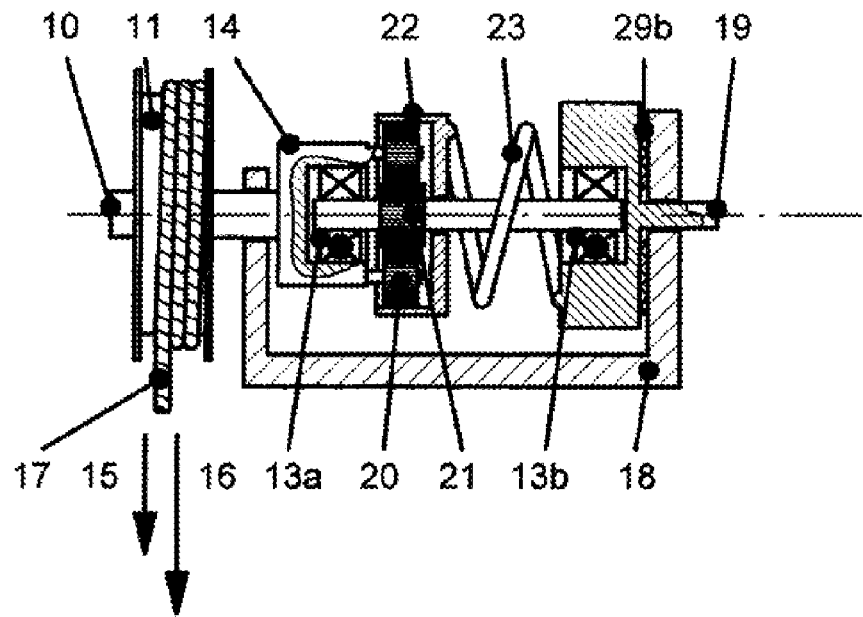

FIG. 18 shows a mechanical rotational system according to the present invention, with torque being supplied by way of the planet carrier and the spring attached to the outer ring, with one actuating direction. To enable loading of the rope drum, the actuator [19] is coupled by the clutch [29b] with the housing [18]. In the first half of the storage cycle, low force [15] is applied to the hauling rope [17] in the initial position. An increase to high force [16] gives rise to clockwise rotation of the rope drum [11] and the planet carrier [14]. Clockwise rotation of the sun gear [21] is prevented by the overrunning clutch [13b]. As a result, the outer ring [22], which is connected to the torsion spring [23], rotates clockwise at a greater angle. At the same time, the overrunning clutch [13a] overruns the stationary axis of the sun gear [21].

In the second half of the storage cycle high force [16] is applied in the initial position. This decreases to low force [15]. Following pre-determined hysteresis at high force [16] anticlockwise rotation of the rope drum [11] occurs. This anticlockwise rotation is brought about by the torsion spring [23]; because of the engaged overrunning clutch [13a] the sun gear [21] can neither be rotated in a clockwise direction nor can it remain stationary, but is rather rotated anticlockwise with the rope drum [11]. The overrunning clutch [13b] with the axis of the sun gear is now disengaged.

Through repetition of the cycle the rope drum [11] is rotated incrementally in an anticlockwise direction and coiling of the rope [17] occurs.

Through disengagement of the clutch [29b] tensile force [15, 16] gives rise to clockwise rotation of the actuator [19].

Figure 19:
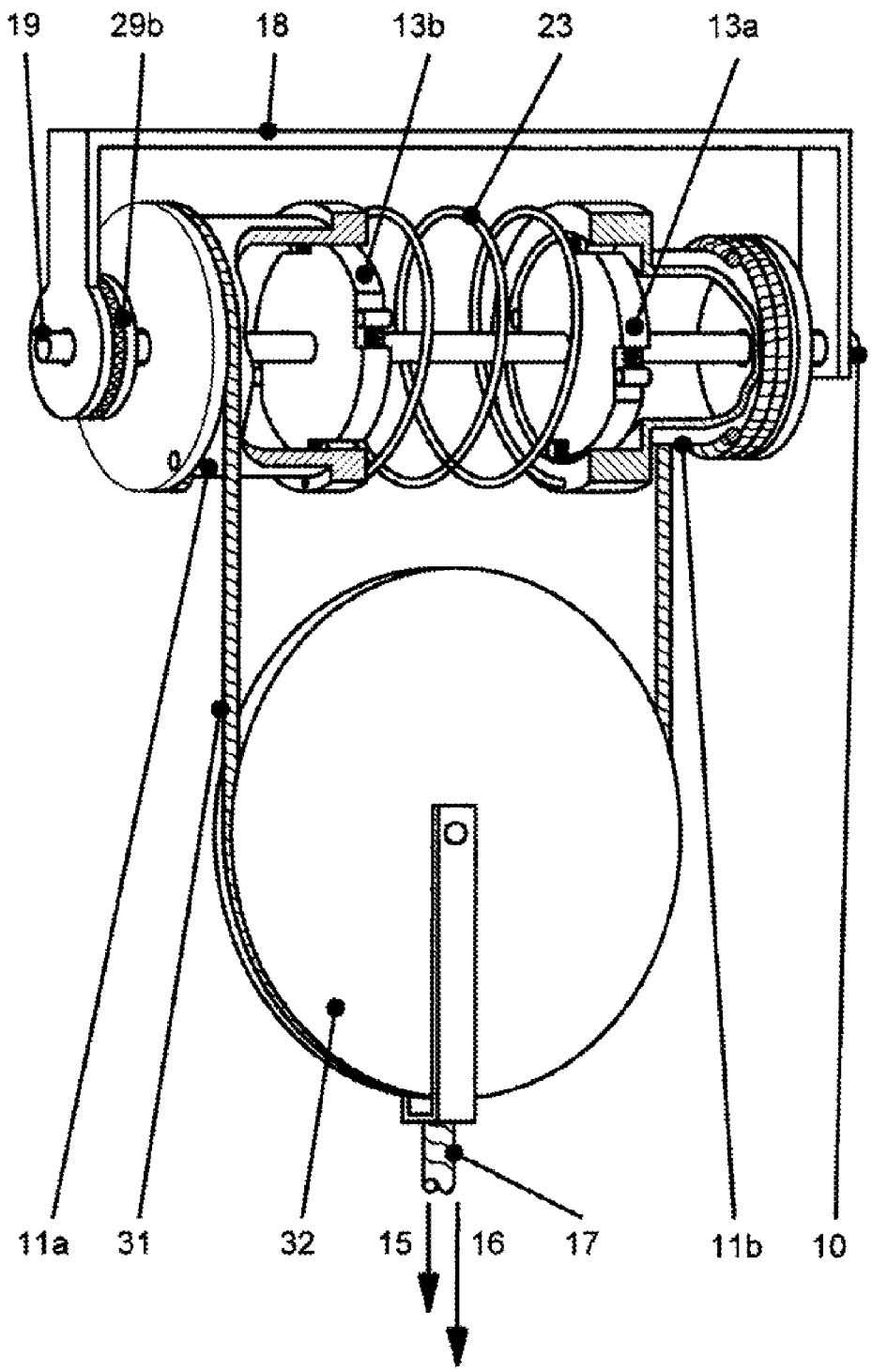

FIG. 19 shows a mechanical rotational system according to the present invention with two rope drums of varied diameter and one rotational actuating direction. To enable loading of the rope drum, the actuator [19], which is identical to the axis [10], is coupled by the clutch [29b] with the housing [18]. The hauling rope [17] distributes force in equal proportions by way of the deflection pulley and the compensating rope, which is coiled in opposite directions to the rope drum on the left [11a] and the rope drum on the right [11b]. In the first half of the storage cycle low force [15] is applied to the hauling rope [17] in the initial position. With an increase to high force [16] clockwise rotation of the rope drum with a large diameter on the left [11a] is prevented by the overrunning clutch [13b]. Clockwise rotation of the rope drum with a small diameter on the right [11b] follows by means of the overrunning clutch [13a] over the stationary axis, and the torsion spring [23], which is attached to the rope drum with a small diameter on the left, is loaded.

In the second half of the storage cycle high force [16] is applied in the initial position. This then decreases to low force [15]. Following pre-determined hysteresis at high force [16] the torsion spring [23], which has no contact to the stationary axis [10], effects anticlockwise rotation of the drum on the left [11a], since clockwise rotation of the rope drum on the right [11b] against the axis [10] is prevented by the overrunning clutch [13b].

In each cycle a greater length of compensating rope is coiled onto the rope drum with a large diameter on the left [11a], while in the same cycle compensating rope is uncoiled from the rope drum with a small diameter on the right [11b].

The deflection pulley [32] with the hauling rope [17] moves incrementally towards the housing [18] against the direction of force.

On disengaging the clutch [29b] tensile force [15, 16] gives rise to clockwise rotation of the actuator [19], since more compensating rope [31] is uncoiled from the rope drum with a large diameter on the left [11a] than can be coiled onto the rope drum with a small diameter on the right [11b]. At the same time, the deflection pulley [32] with the hauling rope [17] moves away from the housing [18] in the direction of tensile force.

Figure 20:
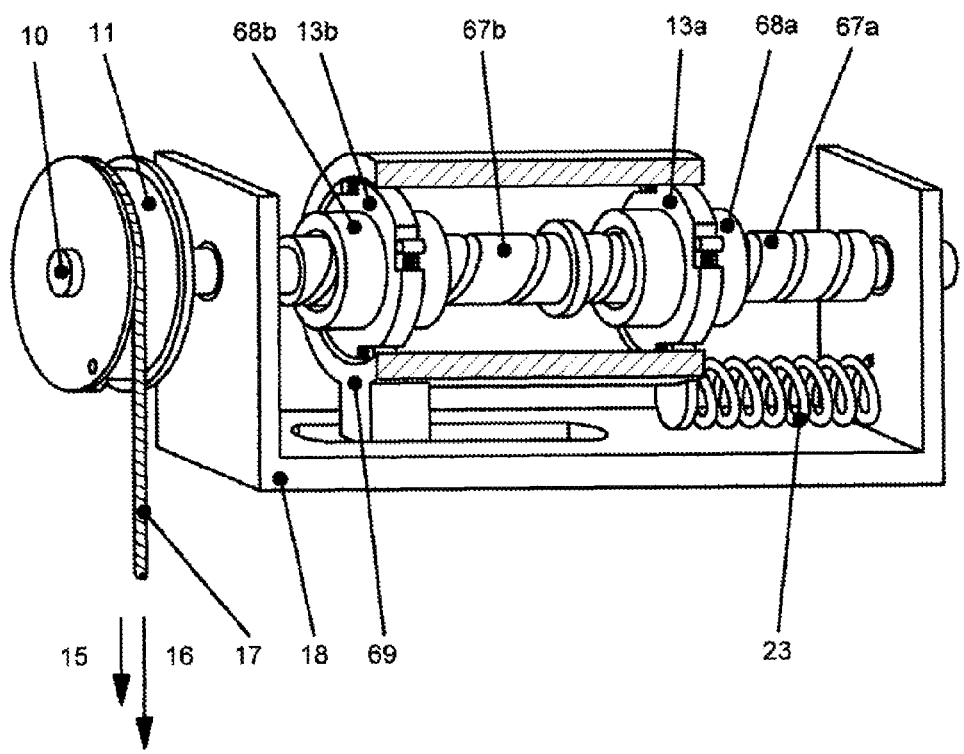

FIG. 20 shows a mechanical rotational system for the storage of hysteresis movements according to the present invention and their utilization with recirculating ball screws, without actuating elements. In the first half of the cycle low force [15] is applied to the hauling rope in the initial position. An increase to high force [16] causes clockwise rotation of the rope drum [11], whereby the fast-threaded ball screw [67b] imposes a load on the respective nut [68b] and moves the housing with linear guideway [69] to the right against the compression spring [23], the overrunning clutch [13b] preventing clockwise rotation. At the same time, the slow-threaded nut [67a] rotates in an anticlockwise direction through the overrunning clutch [13a].

In the second half of the cycle high force [16] is applied in the initial position. This then decreases to low force [15]. Following pre-determined hysteresis at high force [16] the compression spring [23] causes a shifting of the housing with linear guideway [69] to the left. At the same time, the slow-threaded ball screw [67a] sets the axis [10] into anticlockwise rotation, since clockwise rotation of the slow-threaded nut [68a] is prevented by the overrunning clutch [13a]. At the same time, the fast-threaded nut [68b] rotates anticlockwise through the overrunning clutch [13b].

When the housing [18] is constructed rotationally symmetric it can take over the function of the actuator.

LIST OF REFERENCE SIGNS

10 Axis/shaft
11 Rope drum
11a Left rope drum
11b Right rope drum
12 Piston
13a Overrunning clutch with decreasing torque
13b Overrunning clutch with increasing torque
14 Planet carrier storage system
15 Low force
16 High force
17 Hauling rope
18 Housing
19 Actuator
19a Actuator for anticlockwise rotation
19b Actuator for clockwise rotation
20 Planet carrier storage system
21 Sun gear storage system (connected with an axis)
22 Outer ring storage system
23 Spring
23a Innerspring
23b Outer spring
24 Sun gear of a reverse gear unit
25 Outer ring of a reverse gear unit
26 Toothed belt
27 Planet gears of a reverse gear unit
28 Planet carrier of a reverse gear unit
29a Anticlockwise-rotating clutch
29b Clockwise-rotating clutch
29c Lower right clutch
29d Lower left clutch
30 Cylinder and piston combination
31 Compensating rope
32 Deflection pulley
33 Inner hydraulic body
34 Hydraulic ring
35 Inner hydraulic chamber
36 Outer hydraulic chamber
37 Outer hydraulic body
38 Outer pneumatic body
39 Inner pneumatic body
40 Pneumatic ring
41 Chamber separation plate
42 Toothed-belt disk
43 Slipping clutch
44a Upper ratchet with decreasing force
44b Lower ratchet with increasing force
45 Cylinder
46 First chamber
47 Second chamber
48 Static rope
49 Lever
50 Connecting rod
51 Kite/drag sail
52 System for the storage of hysteresis movements and their utilization
53 Reverse gear unit
54 Generator
55 Buoy
56 Ground anchorage
57 Wave-related buoy movement
58a Non-return valve
58b Non-return valve
59 Opposite block
60 Inner pneumatic body
61 First outer pneumatic chamber
62 Second outer pneumatic chamber
63 Valve
64 Hydraulic fluid reserve
65 Hydraulic motor or restrictor
66 Compressed-air motor or restrictor
67a Slow-threaded recirculating ball screw
67b Fast-threaded recirculating ball screw
68a Slow-threaded nut
68b Fast-threaded nut
69 Housing with linear guideway

The invention claimed is:

1. A system for using alternating mechanical force or torque for conversion of force or torque into mechanical movements, comprising
   at least one spring;
   at least one ratchet, overrunning clutch or non-return valve; and
   i) a lever mechanism,
   ii) a gearing,
   iii) hydraulics, or
   iv) pneumatics,
      wherein i)-iv) constitute gearing elements and wherein
      a) said gearing elements move an opposite contact point of the spring by increasing force or torque against the direction of force or torque,
      b) components of the gearing elements according to i) to iv) are blocked by the at least one ratchet, overrunning clutch or non-return valve when the force or torque has decreased, wherein an opposing point of the at least one spring is moved against force or torque,
      c) automatic resumption of this movement of the opposite contact point or opposite point with diminishing force or torque is prevented by the at least one ratchet, overrunning clutch or non-return valve,
      d) a rope which is part of the system is coiled against force or the at least one spring is loaded, and
      e) through several cycles of increasing force or torque combined with corresponding cycles of decreasing force or torque a linear or rotational movement according to a) to d) is repeatedly executed and accumulated against effective force or torque.

2. The system of claim 1, whereas the opposite contact point of the force or torque contact point of the at least one spring is not attached to a housing which is part of the system.

3. The system of claim 1, wherein the at least one ratchet, overrunning clutch or non-return valve is arranged in such a way that, following a cycle of increasing and decreasing load, a distance between the opposite force contact point of the at least one spring and a housing of the system is variable against the direction of force, or an opposite torque contact point of the at least one spring is rotatable against the direction of torque rotation.

4. The system of claim 1, wherein the system disposes of a mechanical, hydraulic or pneumatic gear for transmitting force to the at least one spring.

5. The system of claim 4, wherein the mechanical gear is designed as an epicyclic or planet gear that transmits force or torque via friction or toothing.

6. The system of claim 4, wherein the at least one spring, onto which force is transmitted, is a mechanical or gas spring or is a spring that uses a spring effect between magnets, by which said spring operates as a linear spring or a torsion spring.

7. The system of claim 1, wherein a storage system comprising a rope drum and a second rope drum on the same axis, or alternatively two storage systems, each having a rope drum, on the same axis, coil both ends of said rope in inverse directions, this rope being connected to a hauling rope by means of a deflection pulley.

8. The system of claim 7, wherein the rope drums are connected for the purpose of synchronization via a reverse gear unit with a said at least one spring, which is suitable for the storage of rotational movement.

9. The system of claim 7, further comprising an output shaft for transmitting mechanical movements.

10. The system of claim 9, wherein the output shaft opposite a housing which is part of the system is equipped with at least one activatable slipping clutch or other clutch, whereby the latter is activated either by remote control or directly by physical factors.

11. The system of claim 10, wherein the storage system is attachable as a module to a rope fixed at both ends, and is suitable for the symmetrical coiling of a rope in front of and behind the module with oscillating force.

12. The system of claim 10, wherein said physical factors are pre-determined length or angle, magnitude of force or torque as well as speed, inertia or gravitational direction.

13. The system of claim 11, wherein control and/or actuation can be carried out via further ropes, hawsers, chains or belts for tensile force or bend-resistant elements for compressive force.

14. The system of claim 13, wherein control and/or actuation for kites or drag sails of ships or buoys are realized.

15. The system of claim 13, wherein the bend-resistant elements are rods or gear racks.

16. The system of claim 1, wherein an elevating and/or rotation segment resulting from changes in length and angle effected at the spring are used to drive a minimum of one generator.

17. The system of claim 1, wherein gearing elements are arranged in such a way that with increasing force or torque an existing spring effect on the contact point of force is marked by a steeper spring characteristic, and with decreasing force or torque the existing spring effect is marked by a flatter spring characteristic, whereas the spring itself has a constant spring characteristic and the gearing elements can alter the original spring characteristic with increasing and/or decreasing force or torque or with decreasing force or torque.

18. The system of claim 17, wherein a screw and a recirculating ball screw are part of gearing elements.

19. The system of claim 17, wherein a gearing function is effected via two rope drums with different diameters, a compensating rope and a deflection pulley.

20. A method for utilizing mechanically alternating force or torque, wherein said force or torque is converted into mechanical movements via a spring and gearing elements, wherein
  a) an opposite contact point of a spring is moved, thereby defining a movement, by increasing force or torque against the direction of force or torque via
    i) a lever mechanism,
    ii) gearing,
    iii) hydraulics or
    iv) pneumatics, wherein a) i) to iv) constitute gearing elements and wherein
  b) components of the gearing elements are blocked by at least one ratchet, overrunning clutch or non-return valve when a force or torque has decreased, wherein an opposing point of the spring is moved against force or torque in a movement,
  c) automatic resumption of said movement of the opposite contact point or opposite point with diminishing force or torque is prevented by a ratchet, overrunning clutch or non-return valve and
  d) a rope of the system is coiled against force or the at least one spring is loaded and
  e) through several cycles of increasing force or torque combined with corresponding cycles of decreasing force or torque a linear or rotational movement according to a) to d) is repeatedly executed and accumulated against effective force or torque.

21. The method of claim 20, whereby a speed-change gear, infinitely variable gear or hydraulic pumps and motors are used.

22. The method of claim 20, whereas changes in length or angle brought about by alternating force are transmitted via the spring and gearing elements to the force and torque contact point of the spring, as well as against a direction of force or torque to the opposite contact point of the spring.

23. The method of claim 22, whereas changes in length or angle with decreasing force or torque are transmitted solely to the force or torque contact point of the spring.

24. The method of claim 22, whereby a reduction in the distance from the force contact point of the rope to a housing is effected by cyclic changes in tensile load ($\Delta F$), or an increase in the distance from the force contact point of a bend-resistant element to the housing is effected by cyclic changes in compressive load ($\Delta F$).

25. The method of claim 22, wherein the gearing elements are arranged in such a way that with increasing force or torque an existing spring effect on the contact point of force is marked by a steeper spring characteristic, and with decreasing force or torque an existing spring effect is marked by a flatter spring characteristic, whereas the spring itself has a constant spring characteristic and the gearing elements can alter an original spring characteristic with increasing and/or decreasing force or torque or with decreasing force or torque.

26. The method of claim 20, whereby said at least one ratchet, overrunning clutch or non-return valve is used for accumulation and storage of hysteresis movements produced.

* * * * *